Patented Oct. 17, 1922.

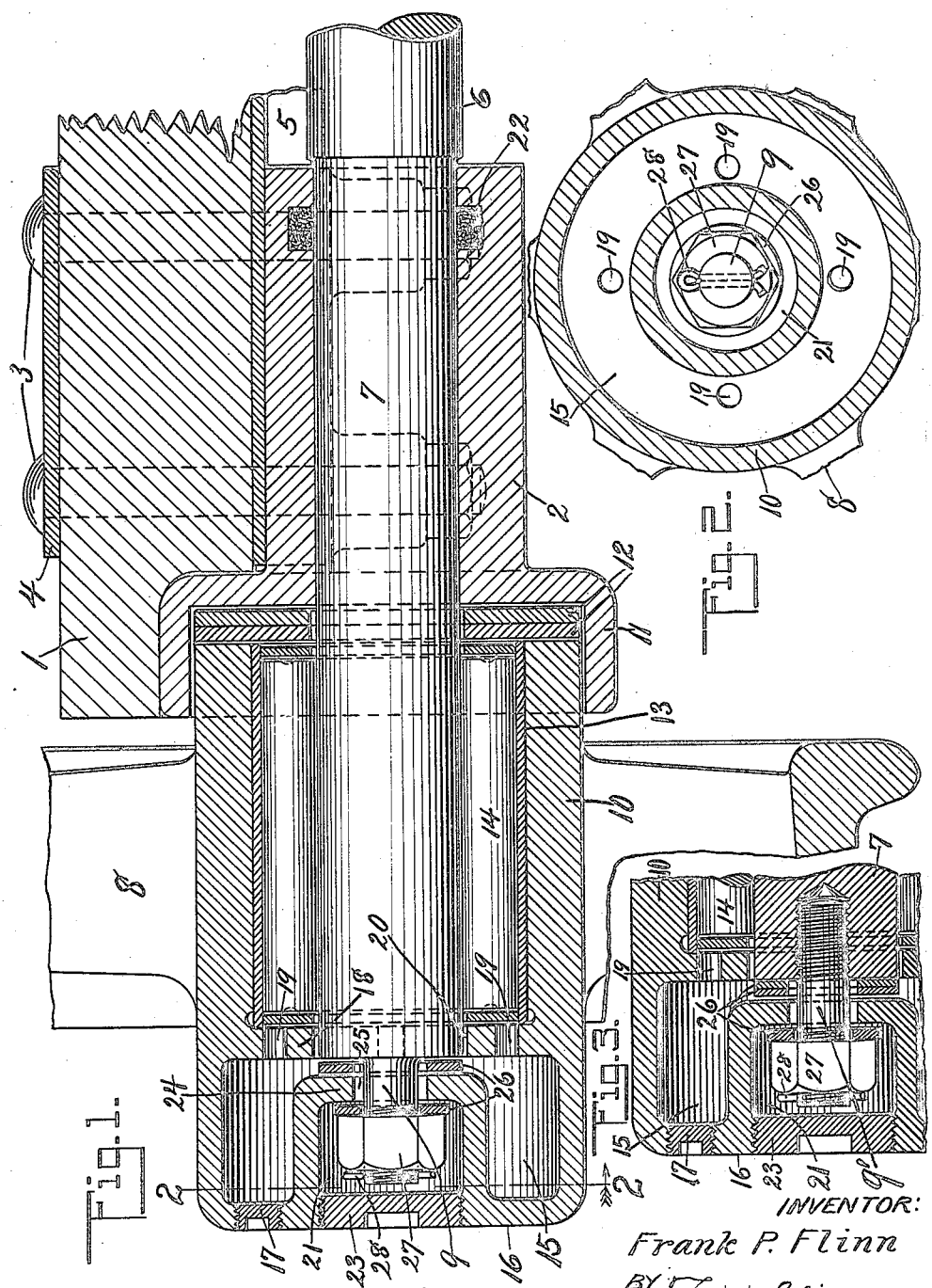

1,432,239

UNITED STATES PATENT OFFICE.

FRANK P. FLINN, OF TERRE HAUTE, INDIANA, ASSIGNOR TO AMERICAN CAR AND FOUNDRY COMPANY, OF NEW YORK, N. Y., A CORPORATION OF NEW JERSEY.

WHEEL-ATTACHING DEVICE.

Application filed May 2, 1922. Serial No. 558,035.

*To all whom it may concern:*

Be it known that I, FRANK P. FLINN, residing at Terre Haute, Vigo County, State of Indiana, and being a citizen of the United States, have invented certain new and useful Improvements in a Wheel-Attaching Device, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a broken central vertical section of my improved wheel attaching device;

Fig. 2 is a section of the wheel hub taken on the line 2—2 of Fig. 1; and

Fig. 3 is a fragmentary section of a wheel hub showing a modified construction of my device.

It is the object of my invention to provide an improved roller bearing wheel and, more particularly, to provide an improved means for securing the wheel on its axle.

In the embodiment of my invention shown in the drawing, my device is shown in connection with a mine car having a flooring 1 to which an axle housing 2, recessed to receive packing 22, is secured by the bolts 3 which pass through openings in the truck tie plate 4, flooring 1, truck channel 5 and housing 2. Mounted in the housing 2 is an axle 6 having a reduced portion 7 which engages with the housing 2 and projects beyond the outer end of the housing 2 to serve as a journal for the wheel 8. The outer end of the journal 7 of the axle 6 is provided with a pin 9 formed integral with the axle 6 and threaded at its end. Instead of forming the pin 9 integral with the axle 6 the journal 7 may be provided at its outer end with a threaded opening as shown in Fig. 3, and a threaded pin 9' screwed therein.

The wheel 8 has a hub 10 adapted to rotate in the enlarged outer end 11 of the housing 2, washers 12 being provided between the engaging faces of the hub 10 and housing 2. The hub 10 has a bore 13, open to the inner face of the hub and adapted to receive a roller bearing 14, and a lubricant chamber 15 having an opening in the front face 16 of the hub 10 closed by a plug 17 and separated from the bore 13 by a wall 18. The wall 18 is provided with openings 19 for the passage of lubricant from the chamber 15 to the bore 13 and with an opening 20 for the journal 7. The front face 16 of the hub 10 has its central portion depressed to form a cylindrical chamber 21 closed at its outer end by a threaded plug 23 and having it inner wall 24 provided with an opening 25 to receive the pin 9. Washers 26 are placed on the pin 9 on opposite sides of the wall 24 and a nut 27, threaded on the pin 9 and secured by a cotter pin 28, keeps the wheel 8 in place on the axle.

What I claim is:

1. In combination, a wheel having a chambered hub with a depression in the chamber wall, an axle for said wheel entering the chamber and depression and means securing the end of the axle in said depression.

2. In combination, a wheel having a chambered hub with a depression in the chamber wall, an axle for said wheel, a pin on said axle entering said depression and a nut on said pin.

3. In combination, a wheel having a chambered hub, a wall for said chamber having a depression therein, an axle for said wheel entering said depression and means in said depression engaging said axle to hold said wheel on said axle.

4. In combination, a wheel having a hub, a chamber in said hub, a wall for said chamber depressed to form a second chamber, an axle for said wheel, a pin projecting from said axle and means in said second chamber engaging said pin to hold said wheel on said axle.

5. In combination, a wheel having a hub, an end wall for said hub depressed to form a chamber therein, an axle for said wheel, a pin on said axle entering said chamber and means on said pin in said chamber adapted to engage said end wall to hold said wheel on said axle.

6. In combination, a wheel having a hub, a lubricant chamber in said hub, a wall for said lubricant chamber having a portion depressed to form a chamber in said lubricant chamber, an axle in said chambers and means in one of said chambers engaging said axle to hold said wheel on said axle.

7. In combination, a wheel having a hub, a lubricant chamber in said hub having a wall depressed to form a chamber in said lubricant chamber, an axle, a pin on said axle projecting into said chambers and means on said pin to hold said wheel on said axle.

8. In combination, a wheel having a hub, a bore in said hub, a lubricant chamber having a wall depressed to form a chamber in said lubricant chamber, a wall separating said bore and lubricant chamber, openings in said wall, an axle for said wheel fitting said openings and means engaging said axle to hold said wheel on said axle.

9. In a wheel having a hub provided with a lubricant chamber therein, a wall for said lubricant chamber forming an end wall of said hub and having a depression therein forming a chamber open at one end in said lubricant chamber, an axle for said wheel, a pin on said axle entering said depression, means in said depression engaging said axle to hold said wheel on said axle and means closing the open end of the chamber formed by said depression.

In witness whereof I have hereunto set my hand in the presence of two witnesses.

FRANK P. FLINN.

Witnesses:
H. S. CALL,
M. W. HOLLINGSWORTH.